(12) United States Patent
Murciego Rodriguez et al.

(10) Patent No.: US 11,760,022 B2
(45) Date of Patent: Sep. 19, 2023

(54) POST-PROCESSING IN ADDITIVE MANUFACTURING

(71) Applicant: HEWLETT-PACKARD DEVELOPMENT COMPANY, L.P., Spring, TX (US)

(72) Inventors: Pablo Antonio Murciego Rodriguez, Sant Cugat del Valles (ES); Vladek Kasperchik, Corvallis, OR (US); Esteve Comas Cespedes, Sant Cugat del Valles (ES); Alexey Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 17/627,545

(22) PCT Filed: Oct. 9, 2019

(86) PCT No.: PCT/US2019/055374
§ 371 (c)(1),
(2) Date: Jan. 14, 2022

(87) PCT Pub. No.: WO2021/071481
PCT Pub. Date: Apr. 15, 2021

(65) Prior Publication Data
US 2022/0258426 A1 Aug. 18, 2022

(51) Int. Cl.
*B29C 64/35* (2017.01)
*B33Y 50/02* (2015.01)
(Continued)

(52) U.S. Cl.
CPC ............ *B29C 64/35* (2017.08); *B29C 64/393* (2017.08); *B33Y 40/20* (2020.01); *B33Y 50/02* (2014.12); *B33Y 70/00* (2014.12)

(58) Field of Classification Search
CPC ..... B29C 64/35; B29C 64/393; B29C 64/165; B33Y 40/20; B33Y 50/02; B33Y 70/00;
(Continued)

(56) References Cited

U.S. PATENT DOCUMENTS

| 7,445,441 B2 | 11/2008 | West |
| 8,334,026 B2 | 12/2012 | Chretien et al. |

(Continued)

FOREIGN PATENT DOCUMENTS

| CN | 109016496 A | 12/2018 |
| WO | WO-2018010773 A1 | 1/2018 |

*Primary Examiner* — Nahida Sultana
(74) *Attorney, Agent, or Firm* — Michael Dryja (57) ABSTRACT

In one example a system is for post-processing a three-dimensional (3D) object generated in an additive manufacturing process in which an identifiable agent is applied to a portion of a build material to form a portion of the 3D object. The system comprises an identification unit and a sensor. The identification unit is to cause the identifiable agent to become distinguishable to thereby cause the portion of the 3D object, corresponding to the portion of build material to which the identifiable agent was applied, to be distinguishable from any build material remnant disposed on the 3D object and to which no identifiable agent was applied. The sensor is to distinguish the build material remnant from the portion of the 3D object.

15 Claims, 4 Drawing Sheets

(51) Int. Cl.
   *B33Y 70/00*       (2020.01)
   *B29C 64/393*      (2017.01)
   *B33Y 40/20*       (2020.01)

(58) Field of Classification Search
   CPC . B08B 5/02; B08B 13/00; B22F 10/39; B22F 2998/10; B22F 10/68
   See application file for complete search history.

(56) References Cited

U.S. PATENT DOCUMENTS

| | | |
|---|---|---|
| 2017/0239893 A1* | 8/2017 | Hoover .................. B29C 64/393 |
| 2018/0104896 A1 | 4/2018 | Lopez et al. |
| 2018/0272602 A1 | 9/2018 | Rudisill et al. |
| 2019/0001580 A1 | 1/2019 | Zenou et al. |
| 2019/0275737 A1 | 9/2019 | Hsiao |
| 2021/0086448 A1* | 3/2021 | Carreon .................. B33Y 50/02 |

* cited by examiner

POST-PROCESSING IN ADDITIVE MANUFACTURING

BACKGROUND

Additive manufacturing systems may be used to generate three-dimensional objects on a layer-by-layer causing portions of a build material to selectively coalesce.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') or a binder agent (in examples where the build material comprises a metal powder) may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. The binder agent may have a composition that, when heated, causes the particles of build material to which binder agent is applied to adhere to one another.

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of print agents comprising visible light enhancers are dye based colored ink and pigment based colored ink, such as inks commercially known as CE039A and CE042A available from HP Inc. In other examples, coalescence may be achieved in some other manner.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

As noted above, additive manufacturing systems may generate objects through the solidification of a build material comprising metal particles, for example a stainless steel powder. This may involve depositing metal build material in layers on a print bed, or build platform and selectively depositing a binder agent (for example using printheads to jet the binder agent) onto portions of a layer of build material in a pattern derived from data representing a slice of a three-dimensional object to be generated (which, may, for example be generated from structural design data). The binder agent may comprise an adhesive element (for example a polymeric concentrate) suspended within a liquid carrier. Following the layer-wise deposition of the metal build material and the selective deposition of the binder agent thereon the build platform and/or the powder contain therein may undergo a curing process during which the build material (including the layers of build material with the binder agent applied and surrounding build material to which no binder agent has been applied) is subjected to heat. The temperature may vary depending on the composition of the build material or other factors. In one example, the curing temperature may be 300° C. or less. In one example, the curing temperature may be between 50° C. and 300° C., for example between 50° C. and 200° C. In yet another example, the curing temperature may be between 50° C. and 70° C., for example approximately 50° C. During the curing process, the binder agent, applied to portions of the build material, is thermally activated when subject to the curing temperatures, causing adhesive particles (e.g. polymeric particles) to separate from the liquid carrier and adhere to particles of the build material while the liquid carrier evaporates, leaving the portions of build material to which binder agent was applied solidifying and effectively being glued together. Post-curing, any build material to which binder agent was not applied ("loose" build material, or build material remnant), e.g. those parts of the build material that will not form part of the generated object, will not solidify and remain as loose, excess, build material.

Curing may be performed on a layer-by-layer basis, in which each layer of build material are heated, or on a global basis in which a plurality of layers of build material are heated. For the curing process, the build platform may be moved to a separate curing station comprising a curing oven or similar.

After curing, the solidified build material (those portions of the build material to which binder agent was applied and have adhered during curing due to the activation of the adhesive) may be referred to as a "green part", being unfinished but substantially resembling the final part (save for some dimensional tolerances). Once cured, to form the final object to be generated from the metal build material, the green part is transferred to a sintering oven in which the green part undergoes a sintering process. During sintering, the green part is exposed to elevated temperatures to sinter the build material particles (of the green part) into the final, solid, three-dimensional object. The temperature may depend on the composition of the build material and, for example, may be below the full melting temperature of the build material. The sintering temperature may, in some examples, be approximately between 0% and 20% below the melting temperature for a particular build material. For example, the build material may comprise aluminium alloy particles and sintering of the green part made of aluminium alloy particles may be performed at a sintering temperature that is between 590° C. and 620° C. In examples where the build material comprises copper, green parts made of copper powder may be sintered at temperatures between 750° C. and 1000° C. For example, where the build material comprises brass powder, the resulting green part may be sintered between 850° C. and 950° C. For a build material comprising stainless steel (for example comprising stainless steel powder) the green part may be subject to a temperature of between 1100° C. and 1400° C. or, for example, a temperature of over 1300° C. but not higher than 1380° C. and 1400° C., e.g. for 316 L stainless steel alloys.

However, after curing and prior to sintering, the green part undergoes a post-processing operating during which the green part is cleaned in order to remove excess powder (e.g. excess build material) in a process often referred to as "de-caking". The de-caking process is so that any remaining build material (build material remnant or "caked" powder) can be removed from the green part since, if not removed, the remaining build material may fuse during the sintering process which could create anomalies in the geometry of the final part. In some examples, de-caking comprises a coarse de-caking (in which the majority of the excess build material may be removed from the green part, e.g. by blowing air across the green part) and a fine de-caking (in which the remainder of excess build material is removed, e.g. manually or by using pressurised air such as an air knife).

In some examples, the binder agent that is applied to portions of the build material is substantially transparent, and the portions of build material to which binder agent is applied may therefore be visually indistinguishable from portions of build material to which binder agent is not applied. This may make distinguishing the green part from excess, loose, build material remnant difficult during the de-caking process. In turn, this may make it difficult to precisely control the geometry of the final part as it may be difficult to ensure that no excess build material remnant remains on the green part prior to sintering.

Some examples herein relate to incorporating an identifiable agent (for example, a visually identifiable agent) into the additive manufacturing process to identify loose build material on the green part during a post-processing operation such as de-caking (following curing). According to these examples, an identifiable agent may be distributed onto portions of a layer of build material in a pattern derived from data representing a slice of a three-dimensional object to be generated. For this purpose, in some examples the binder agent may comprise the identifiable agent (e.g. the identifiable agent may be suspended within the binder agent), or, in the case of 3D printing plastic parts, the fusing agent may comprise the identifiable agent. In other examples, however, the identifiable agent may be a separate agent that is to be applied to the build material, for example the identifiable agent may be applied to those portions of a layer of build material to which binder agent (or fusing agent) was applied. The identifiable agent may comprise a component (for example a fluorescent component) that may become distinguishable (e.g. on application of energy or when viewed through a filter) and, in this way, since the identifiable agent may be applied with the binder agent (or fusing agent), or separately to the binder agent (or fusing agent), to those portions of build material to which binder agent or fusing agent is applied, or is to be applied, and therefore to portions of build material that (in the example of 3D printing a metal object) will become the green part, the green part may become distinguishable (e.g. visually distinguishable) from any excess or loose build material. The binder agent may comprise a fluorescent additive, or a component reflecting (or not reflecting) light within a frequency range visible through a filter, or a component that becomes visible when subject to heat.

Some examples herein relate to a post-processing system, or station, for use in an additive manufacturing process, for example for use in a de-caking process, for example in a metal 3D printing process. The post-processing system according to some examples comprises an identification unit that is to cause the identifiable agent (which may be either in the binder agent or applied as a separate agent) to become distinguishable (for example, visually distinguishable), and a sensor that is to distinguish the build material to which binder agent is applied from the excess build material. As will be described with reference to some examples below, this will enable a high-contrast image to be produced in which the excess build material is able to be distinguished (e.g. by the sensor) from the green part which can, in turn, enable more effective and/or automated cleaning. As will be described below, in one example the binder agent may comprise a fluorescent additive and the identification unit may comprise comprises an ultraviolet (UV) light source to emit UV light towards the build material, and the sensor may comprise a UV sensor to receive UV light. In this example, the fluorescent additive may fluoresce under the UV light emitted by the identification unit and the sensor may determine excess powder as those areas of the 3D object that are not fluorescing, or emitting UV light. This may enable automatic cleaning as a controller may be to direct a cleaning unit toward and proximate those non-fluorescing areas and direct compressed air (or similar) toward those areas to blow excess powder off the green part. In another example, the binder agent may comprise an Infrared (IR) additive and the sensor may be to generate a "heat map" of the object to determine where there is excess powder.

Accordingly, some examples herein relate to a system, method, and machine-readable instructions in which a 3D object is to be generated from object model data. The 3D object may be generated as part of a plastic 3D printing process (in which a build material comprising plastic particles is used) or as part of a metal 3D printing process (in which a build material comprising metal particles is used). In other examples, the 3D object may be generated from build material comprising ceramic particles. In examples where the build material comprises plastic particles then a fusing agent may be applied to a portion of a layer of build material that will form the 3D object. In examples where the build material comprises metal particles (e.g. stainless steel) then a binder agent may be applied to a portion of layer of build material that will form the 3D object. In either example however, and according to some examples presented herein, an identifiable agent may be applied to a portion of a layer of build material that is to form a portion of the 3D object. In other words, the identifiable agent may be applied to a portion of a build material comprising plastic particles to which fusing agent is applied, and therefore to a portion of a build material that is to form a portion of the 3D (plastic) object. In some examples the fusing agent may comprise the identifiable agent but in other examples the identifiable agent may be a separate agent. The identifiable agent may be applied to a portion of a build material comprising metal particles to which binder agent is applied, and therefore to a portion of a build material that is to form a portion of the 3D (metal) object (e.g. the green part). In some examples the binder agent may comprise the identifiable agent but in other examples the identifiable agent may be a separate agent.

Figure 1:
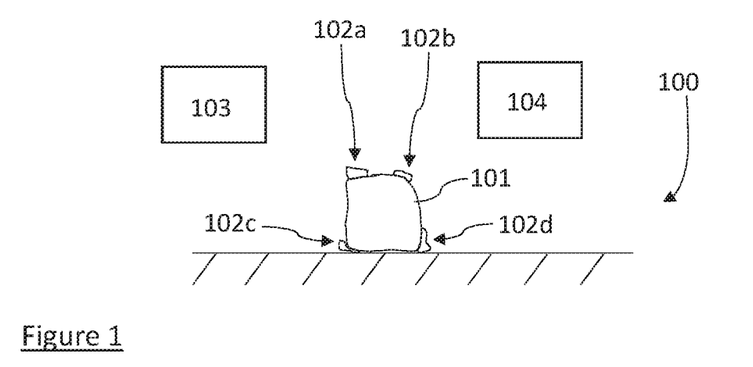
FIG. 1 is a simplified schematic of an example post-processing system.

FIG. 1 shows an example system 100 for the post-processing of a three-dimensional (3D) object 101 generated in an additive manufacturing process. To generate the object 101, an identifiable agent (for example, a visually identifiable agent), is applied to a portion of build material that is to form part of an object once the build material is cured and sintered. To generate the object 101, a binder agent (or, in the case of 3D printing a plastics part, a fusing agent) may be applied to a portion of build material that is to form part of an object once the build material is cured and sintered, and the identifiable agent may be applied to a portion of build material to which binder agent (or fusing agent) is applied. The binder agent, or fusing agent, may comprise the identifiable agent or the identifiable agent may be a separate agent. In a 3D metal printing process, to generate the object 101, binder agent is applied to portions of build material that correspond to the object to be generated in additive manufacturing (e.g. according to structural design data) and the build material is then cured (e.g. in a curing process as described above) to activate the adhesive in the binder agent to adhere the build material into a solid object. The object 101 received in the post-processing system 100 therefore comprises a green part (as described above). As also described above, excess build material, or build material remnant, 102a-d may remain on, or be attached to, the green part 101. The system 100 comprises an identification unit 103 that is to cause the identifiable agent (which may be part of the binder agent or may be applied separately to the binder agent), and at least a portion of the green part to become distinguishable (for example, visually distinguishable). The identification unit 103 may therefore to cause the portion of the 3D object to which binder agent was applied (all or a portion of the green part) to be distinguishable from the build material remnant 102a-d, or in the case of a build material comprising plastic particles, the identification unit 103 may be to cause the portion of the 3D object to which fusing agent was applied to be distinguishable from any build material remnant thereon. The system 100 comprises a sensor 104 to distinguish the build material remnant 102a-d from the portion of the 3D object (to which binder agent was applied). Therefore, the identification unit 103 is to cause the green part to be distinguishable from excess build material, since binder agent is applied to portions of build material that will from the green part but is not applied to portions of build material that will not form a portion of the object. For example, the identifiable agent may comprise a fluorescent additive and the identification unit 103 may comprise a UV light source. The green part 101 may fluoresce under the UV light, which may be detected by the sensor 104, the sensor therefore being able to distinguish the green part 101 from the excess powder 102a-d, in this example, based on the degree, or absence, of fluorescence. For generating a 3D object from a build material comprising plastic particles, this will enable excess powder remnant to be identified on the 3D part (e.g. once it is removed from the build bed).

Figure 2A:
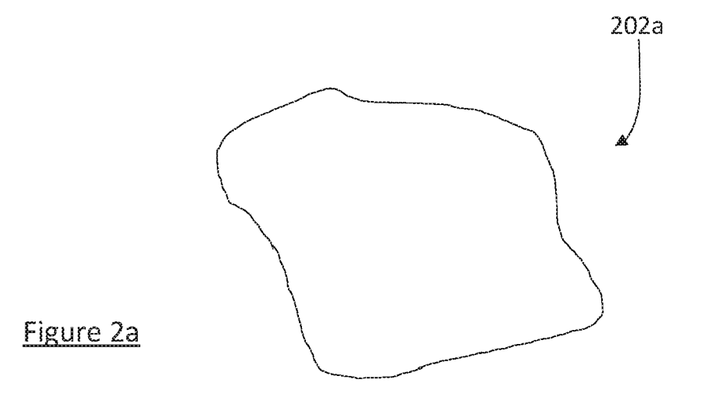
FIGS. 2a and 2b are simplified schematics of an example three-dimensional object.

This is schematically shown in FIGS. 2a and 2b. FIG. 2a shows an object 202a, e.g. received in a post-processing system such as the system 100, which comprises a green part. In other words, the object 202a comprises adhered build material (build material to which binder agent was applied prior to a curing stage) that is to be de-caked prior to undergoing a sintering process. As FIG. 2a schematically shows, the object 202a may comprise a green part and excess powder dispose on or around the green part, but due to the transparency of the binder material, or due to a similarity in colour between the build material and the binder material, it may be difficult to determine those areas of the object 202a which contain excess powder, and therefore those areas of the object 202a which require cleaning.

Figure 2B:
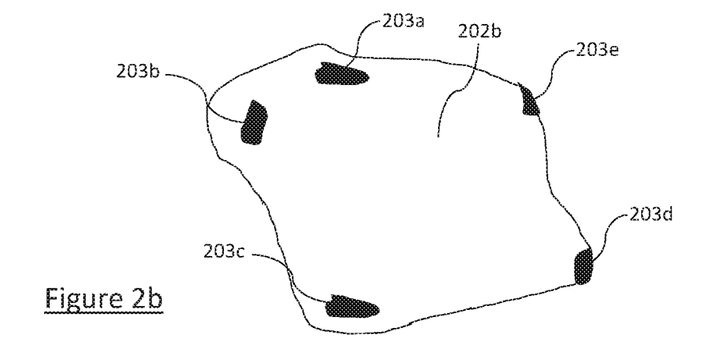

FIG. 2b schematically indicates a high-contrast image, or map, e.g. that may be generated by the sensor 104 of the system 100, of the object 202a. The image shown in FIG. 2b shows that the object comprises a green part 202b and build material remnant 203a-e disposed on various areas of the green part 202b. In this example, the shade of colour indicates the density of build material remnant that is disposed on the green part 202b. As will be discussed below with reference to FIG. 3, the high-contrast map schematically shown in FIG. 2b may enable the automatic cleaning, or de-caking, of the green part 202b as a controller may be to direct a cleaning nozzle of a cleaning module to those areas of the green part that have excess powder, as identified by the image shown in FIG. 2b. The sensor 104 may produce the image schematically indicated in FIG. 2b.

For example, the identifiable agent may comprise a fluorescent component, or additive, such that the identifiable agent may fluoresce when subject to UV light. In examples where a binder agent, or a fusing agent, comprises the identifiable agent then the binder agent, or fusing agent, will fluoresce when subject to UV light. In this example, the identification unit 103 may comprise a source of UV light and the sensor 104 may be to detect reflect or emitted UV light from the binder agent. For example, the sensor may comprise a UV sensor such as a UV imaging device, such as a UV camera. The image shown in FIG. 2b in this example may therefore comprise a UV image, with those areas of the green part 202b being lighter in colour due to their induced fluorescence, with the excess powder areas 203a-e being darker in colour as they will not fluoresce. The green part, due the identifiable agent present in those portions of build material that correspond to portions of the green part, may emit UV light within a narrow wavelength band when subject to a UV light. In another example, the green part, due the identifiable agent in the build material, may reflect UV light. In either example, the emitted, or reflected, UV light from the green part (due to the identifiable agent contained therein) will enable the green part to be viewed in high contrast to any excess powder disposed thereabout or thereon which may show up as darker areas on the image.

In another example, the identifiable agent may comprise an infrared (IR) component, e.g. near-infrared (NIR) in which case the identifiable agent may comprise an IR, or NIR, additive. In this example, the image shown in FIG. 2b may comprise an IR, or NIR, image, the identification unit 103 in this example being to emit IR light and the sensor 104 being sensitive to IR light. In the image of FIG. 2b in this example, the green part 202b is shown in high contrast to the excess powder 203a-e thereon, as the green part (due to the identifiable agent in the binder agent) may reflect IR, or NIR, light emitted by the identification unit 103, which may then be detected by the sensor 104 to form the image shown in FIG. 2b. In this example, the excess powder 203a-e may not reflect the IR, or NIR, light as no identifiable agent is present in the excess powder.

In another example, the identifiable agent may comprise a thermal component that will be distinguishable when viewed through a thermal imaging camera. In this example, the image shown in FIG. 2b may comprise a thermogram produced by a thermal imaging camera and the green part 202b may be shown in thermal contrast to the excess powder 203a-e. For example, the identification unit 103 may comprise an energy source to produce a thermal contrast between the green part and the excess powder in order to show the contrast therebetween.

In another example, the identifiable agent may comprise a component that is distinguishable when viewed through a filter. In this example, the identification unit 103 may comprise a filter and the sensor 104 may be to visualise the object viewed through the filter of the identification unit 103. In this example the identification unit 103 and sensor 104 may comprise a single unit (e.g. an image filtering module) capable of producing the high-contrast image shown in FIG. 2b by reproducing an image of the green part and excess powder 203a-e when viewed through the filter of the identification unit 103.

In other examples, the sensor 104 may comprise a high-resolution camera, artificial intelligence, image processing electronics. In some examples, the identification unit 103 and the sensor 104 may be provided in a single unit.

It will be appreciated that in some examples the identification unit 103 and the sensor 104 may be part of a single unit, or module. For example, a UV sensor, IR sensor, thermal imaging sensor, filter, etc. may be a single unit which has the processing capability to both cause the identifiable agent to become distinguishable and to distinguish the binder agent, to thereby distinguish the portion of the object that corresponds to the portion of build material to which binder agent was applied (the green part) 202b from building material remnant 203a-e disposed thereon, and to generate the image such as that shown in FIG. 2b.

Figure 3:
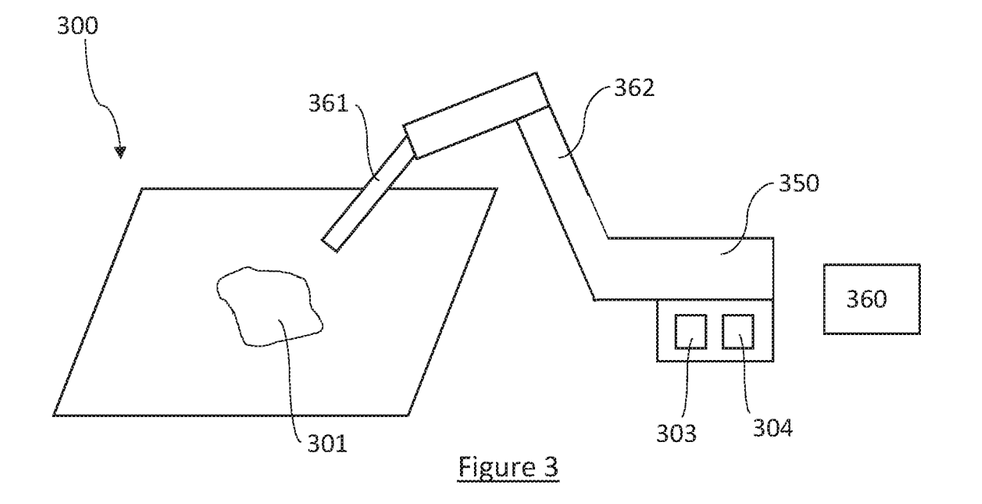
FIG. 3 is a simplified schematic of an example post-processing system.

FIG. 3 shows an example system 300 for the post-processing of a 3D object 301 generated in additive manufacturing, and which may comprise the system 100 as shown in FIG. 1. As for the system 100 of FIG. 1, the object 301 was generated in an additive manufacturing process in which an identifiable agent (e.g. a visually identifiable agent), was applied to a portion of build material that is to form part of an object once the build material is cured and sintered. To generate the object 301 in this example, a binder agent is applied to portions of build material that correspond to the object to be generated in additive manufacturing (e.g. according to structural design data) and the build material is then cured (e.g. in a curing process as described above). The object 301 therefore comprises a green part (as described above). As also described above, excess build material, or build material remnant may remain on, or be attached to, the green part 301. For the purposes of removing the build material remnant (for example, before the green part undergoes sintering), the system 300 comprises a cleaning module 350 and a controller 360 for the cleaning module 350. The controller 360 is to control the cleaning module 350 to remove the build material remnant from the green part 301. For this purpose, the controller 360 in the example of FIG. 3 comprises a cleaning nozzle 361 to expel compressed air, and an articulated arm 362 connected to the cleaning nozzle to move the nozzle 361 and thereby to direct the compressed air. The controller 360 of this example controls movement of the articulated arm 362 to control the locations at which compressed air is expelled via the nozzle 361. The controller 360 therefore may be to direct, via controlling movement of the arm 362, the nozzle 361 to expel compressed air proximate the build material remnant, the compressed air blowing the remnant away from or off the green part 301 to de-cake the green part. The post-processing system 100 and/or 300 may therefore comprise a cleaning station, or a de-caking station (for example, a fine de-caking station).

As for the system 100, the system 300 comprises an identification unit 303 to cause the identifiable agent, and therefore a substantial portion (or all of) the green part 301 since the green part is comprised of build material to which the identifiable agent was applied (either with, or applied separately from, binder agent), to become distinguishable (for example, visually distinguishable). The identification unit 301 may therefore to cause the portion of the 3D object to which binder agent was applied (all or a portion of the green part) to be distinguishable from any build material remnant. As for the system 100, the system 300 comprises a sensor 304 to distinguish the build material remnant from the portion of the 3D object (to which binder agent was applied). The identification unit 303 is to cause the green part to be distinguishable (e.g. visually distinguishable) from excess build material since binder agent is applied to portions of build material that will from the green part, but is not applied to other portions of build material. In the example of FIG. 3, the identification unit 303 and sensor 304 are shown disposed in the cleaning module 350. In other words, the cleaning module 350 comprises the identification unit 303 and sensor 304. However, in other examples the identification unit 303 and/or the sensor 304 may be separate from the cleaning module 350. Additionally, the controller 360 is shown remote from the cleaning module 350 but, in another example, the cleaning module 350 may comprise the controller 360.

Once the identification unit 303 causes the identifiable agent in the binder element to become distinguished, the sensor 304 is able to create an image of the object 301, for example the image shown schematically in the example of FIG. 2b, in which green part 301 becomes distinguished from any build material remnant thereon. The controller 360 may be communicatively coupled to the sensor 304 and may control the cleaning module 350 to remove the any build material remnant from the green part 301 based on the image generated by the sensor 304. In one example, the articulated arm 362, under the control of the controller 360, may be operated to move such that the nozzle 361 is positioned proximate any areas of the green part 301 where there is build material remnant disposed thereon, and the nozzle 361 may be operated, under control of the controller 360, to jet compressed air towards those areas to remove the build material remnant. This process may be part of the coarse or fine de-caking process.

The system 300 may therefore comprise a cleaning, or de-caking, station for a 3D object that may be to automatically remove build material remnant from a green part. For example, once the object 301 is placed inside the system 300 (for example a platform thereof), manual intervention by a human user may not be needed to remove excess build material from the green part. Rather, the cleaning module 350, under control of the controller 360, may be operated to automatically detect areas of the green part (based on the image such as that shown in FIG. 2b) where there is build material remnant and may then be operated to remove the build material remnant, as described above. For this purpose, in one example the system 300 may comprise a conveyor and/or a plurality of cleaning modules. In such examples, the automation of de-caking green parts may be possible on a more industrial scale as, once green parts are placed on the conveyor, they may advance past a cleaning module that may automatically remove build material remnant disposed thereof, for example as described above. In this way the systems 100 and 300 can facilitate an automatic, closed-loop, cleaning process. After cleaning, the objects may automatically advance into storage before being transported to a sintering oven, or directly to a sintering oven.

In some examples, the identifiable agent may be applied according to pattern data describing a pattern to be formed in the object. For example, the pattern may comprise an identification pattern that enables the object to be identified, for example a letter, number, bar code, QR code etc. For this purpose, the sensor may be to detect a visually identifiable pattern in the object in order to identify and/or classify the object (e.g. its batch or type). In some examples, the sensor may comprise a scanner.

Figure 4:
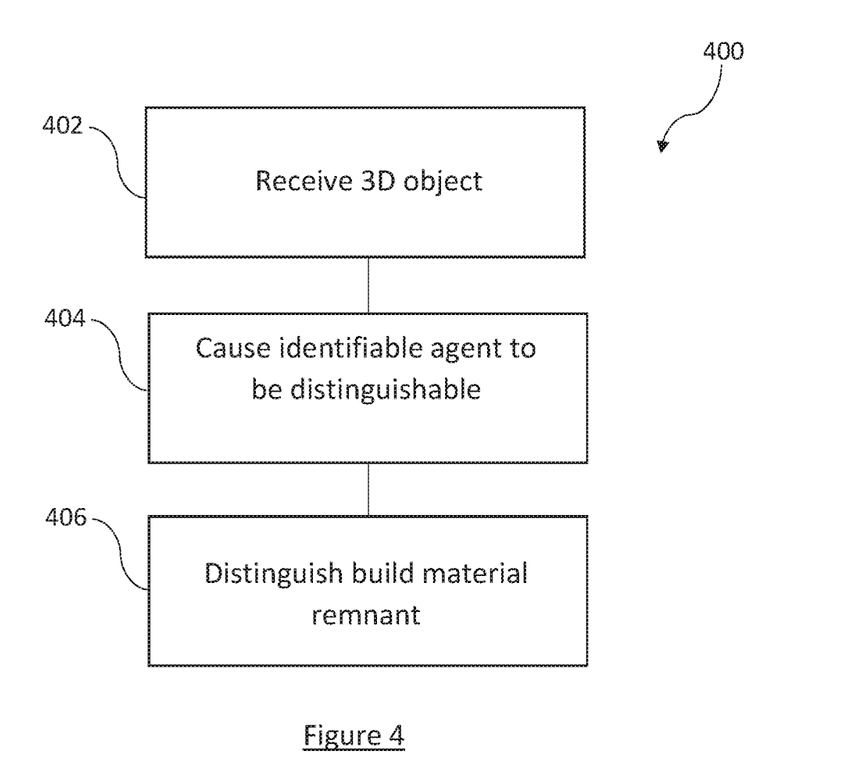
FIG. 4 is a flowchart of an example of a method.

FIG. 4 shows an example method 400, which may be a computer-implemented method, and which may be a method for post-processing a 3D object generated in additive manufacturing. For example, the method 400 may comprise a method for post-processing a 3D object generated in additive manufacturing during which a binder agent, or a fusing agent, is applied to a portion of build material to form a portion of the 3D object. The method 400 may comprise a method for post-processing a 3D object generated in additive manufacturing during which an identifiable agent is applied to a portion of build material to form a portion of the 3D object (e.g. to a portion of build material to which binder agent, or fusing agent, is applied or is to be applied). In one example, the method 400 may comprise a method for post-processing a 3D object generated in additive manufacturing during which a binder agent comprising an identifiable agent is applied to a portion of build material to form a portion of the 3D object and subsequently cured. In one example, the method 400 may comprise a method of at least partially cleaning or de-caking a green part.

At block 402 the method comprises receiving, for example in a post-processing system such as the system 100 or 300 as described above, for example on a platform or conveyor thereof, a 3D object generated in an additive manufacturing process in which an identifiable agent is applied to a portion of a build material to form a portion of the 3D object. The 3D object received at block 402 may be a 3D objet generated in an additive manufacturing process at which binder agent was applied to a portion of build material to form a portion of the 3D object (and therefore I some examples the identifiable agent may be applied to a portion of build material to which binder agent was applied, or was to be applied). Block 402 may comprise moving, e.g. automatically moving, the object into a post-processing system.

At block 404 the method comprises causing, e.g. by a controller or a source of energy such as UV, IR, or thermal energy, the identifiable agent (which may in some examples be in the binder agent) to become distinguishable (e.g. visually distinguishable), thereby causing a portion of the 3D object, corresponding to the portion of build material to which binder agent was applied, to be distinguishable (e.g. visually distinguishable) from any build material remnant disposed on the 3D object and to which no binder agent was applied.

At block 406 the method comprises distinguishing, e.g. by a sensor or a processor, the build material remnant from the portion of the 3D object.

Bocks 404 and 406, separately or in combination, may comprise activating a single unit to generate an image of the object where the build material remnant is distinguishable. For example, blocks 404 and 406, separately or in combination, may comprise activating a UV light source and sensor, thermal camera, IR source and sensor, filter assembly, high-resolution camera, artificial intelligence, image processing electronics, etc.

As described above with reference to FIGS. 1-3, the method 400 may enable the automatic cleaning, or de-caking, of a green part by causing the green part to be distinguishable from build material remnant disposed thereon, by virtue of causing the identifiable agent to be distinguishable. As will be explained with reference to FIG. 5, the method 400 may comprise cleaning, or de-caking, the object following distinguishing, e.g. by a sensor, the build material remnant from the green part.

Figure 5:
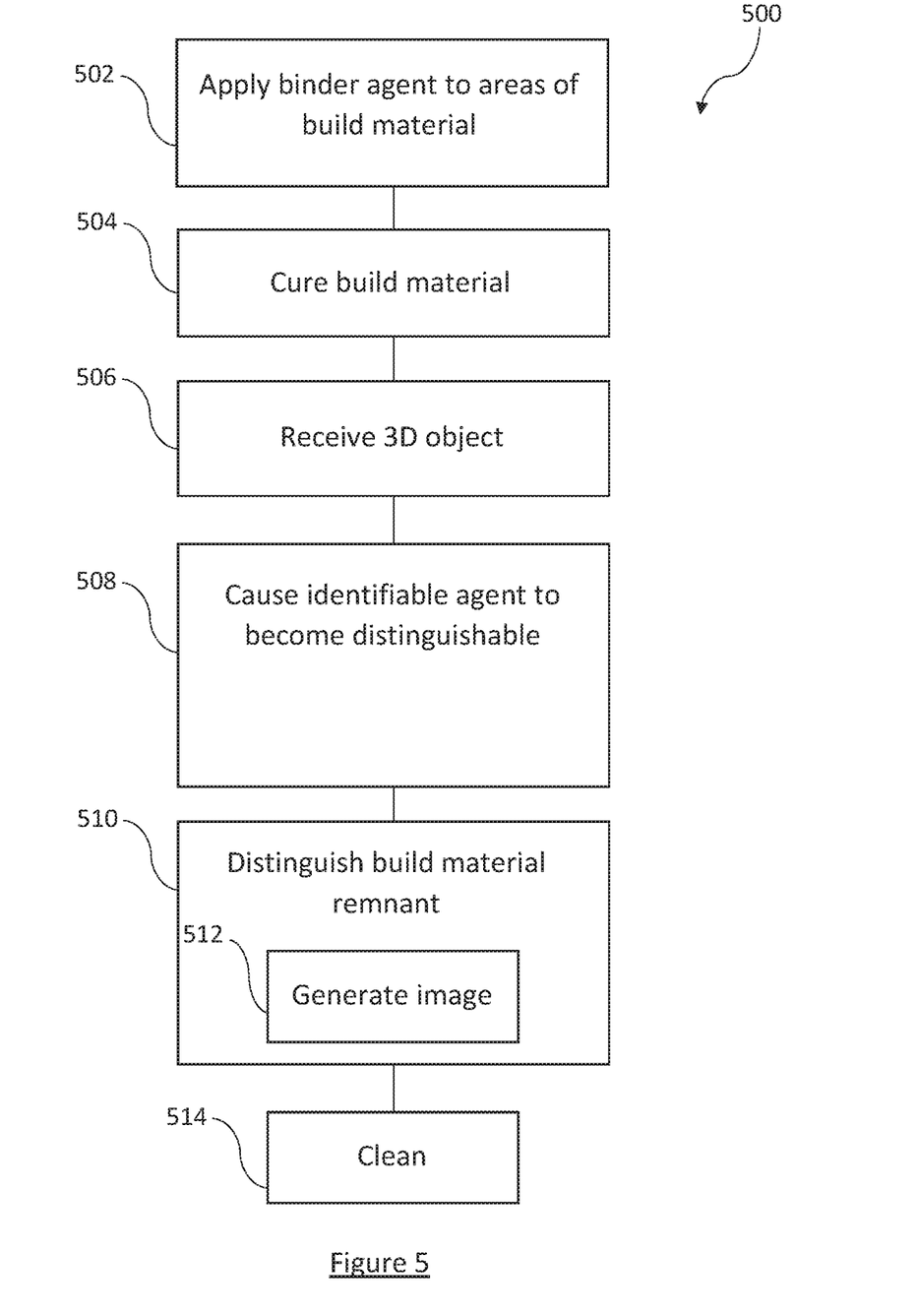
FIG. 5 is a flowchart of an example of a method.

FIG. 5 shows an example method 500, which may be a computer-implemented method, and which may be a method for post-processing a 3D object generated in additive manufacturing and/or which may comprise the method 400. For example, the method 500 may comprise a method for post-processing a 3D object generated in additive manufacturing during which an identifiable agent is applied to a portion of build material to form a portion of the 3D object. In one example, the method 400 may comprise a method for post-processing a 3D object generated in additive manufacturing during which an identifiable agent is applied to a portion of build material to form a portion of the 3D object and subsequently cured. In one example, the method 500 may comprise a method of at least partially cleaning or de-caking a green part.

At block 502 the method comprises generating the object in an additive manufacturing process. For example, block 502 comprises applying, e.g. under the control of a controller, an identifiable agent, e.g. via a jetting nozzle, to portions of a build material that correspond to portions of the object to be generated. Block 502 may comprise applying a layer of build material, e.g. in a build unit, and applying identifiable agent to portions of the build material that correspond to portions of the object to be generated. Block 502 may comprise depositing and applying identifiable agent layer by layer. Block 502 may therefore be repeated for each layer of build material. The portions of the build material which correspond to portions of the object to be generated, and to which identifiable agent are applied, may be determined by object generation instructions that are to generate the object in a printing process based on object model data describing the object to be generated. In one example, block 502 may comprise adding the identifiable agent (for example, a visually identifiable agent) to a binder agent, or to a fusing agent, to be applied to the build material or, in another example, block 502 may comprise applying a binder agent, or a fusing agent, to the build material, either before or after the application of the identifiable agent. In other words, block 502 may comprise applying, e.g. under the control of a controller, a binder agent or a fusing agent, e.g. via a jetting nozzle, to portions of a build material that correspond to portions of the object to be generated. Block 502 may comprise applying a layer of build material, e.g. in a build unit, and applying binder agent or fusing agent to portions of the build material that correspond to portions of the object to be generated. Block 502 may comprise depositing and applying binder agent or fusing agent layer by layer. The portions of the build material which correspond to portions of the object to be generated, and to which binder agent or fusing agent are applied, may be determined by object generation instructions that are to generate the object in a printing process based on object model data describing the object to be generated. Block 502 may therefore comprise applying identifiable agent to a portion of a layer of build material to which binder agent, or fusing agent, is applied or is to be applied.

At block 504 the method comprises curing the build material. Block 504 may comprise subjecting the build material to a temperature of up to 200° C. Block 504 may comprise activating heat lamps, e.g. in a build unit, to heat and cure the build material. Together, blocks 502 and 504 may therefore comprise forming a green part, for example based on object model data describing an object to be generated in an additive manufacturing process. For a build material comprising plastic, block 504 may comprise applying heat to the build material to heat and fuse the build material.

At block 506 the method comprises receiving a 3D object generated in an additive manufacturing process in which an identifiable agent (for example, a visually identifiable agent) is applied to a portion of a build material to form a portion of the 3D object, for example as described above with reference to block 402 of the method 400. Block 506 may comprise receiving the cured object (having been cured at block 504 of the method) in a post-processing system (such as the system 100 or 300 as described above). Block 506 may comprise moving, e.g. automatically moving, the object into a post-processing system.

At block 508 the method comprises causing the identifiable agent to become distinguishable, thereby causing a portion of the 3D object, corresponding to the portion of build material to which binder agent was applied, to be distinguishable from any build material remnant, for example as described above with reference to block 404 of the method 400.

At block 510 the method comprises distinguishing, e.g. by a sensor or a processor, the build material remnant from the portion of the 3D object, for example as described above with reference to block 406 of the method 400. In this example, block 510 comprises, at block 512, generating, e.g. by the sensor or a processor, an image of the object in which the portions of the object to which the binder agent was applied are shown in high contrast to may build material remnant thereon, for example as shown in FIG. 2b. Block 512 therefore comprises generating, e.g. by a sensor or a processor, an image in which the green part is distinguishable from any build material remnant thereon.

At block 514 the method comprises cleaning, or de-caking, the object. Block 514 may comprise operating a cleaning module to move proximate a portion of the object that has build material remnant thereon to clean and remove the build material remnant. Block 514 may comprise operating a cleaning module to cause air, e.g. compressed air, to be jetted toward build material remnant to blow the remnant off the green part. Block 514 may therefore comprise de-caking a green part prior to a sintering process.

The method 500 may additionally comprise transporting the cleaned, or de-caked, green part to a sintering oven for sintering. The method 500 may be part of an automated process to transport and clean cured objects prior to sintering. For example the method 500 may comprise receiving a plurality of objects, e.g. at block 506, on a conveyor and may comprise advancing the any received objects through a cleaning station, in which, at blocks 508-514, they may be automatically cleaned by a number of cleaning units, e.g. under the control of a controller and utilising the image generated at block 512. In these examples, the cleaning units may comprise movable components that are independently positionable, under the control of a controller, proximate areas of the object comprising build material remnant so as to remove the build material remnant.

With reference to FIGS. 1-3, the identification unit 103 or 303 may be to carry out blocks 402 or 508 of the method 400 or 500, the sensor 104 or 304 may be to carry out blocks 406 or 510 of the method 400 of 500 and/or the cleaning unit 350 may be to carry out block 514 of the method 500.

Figure 6:
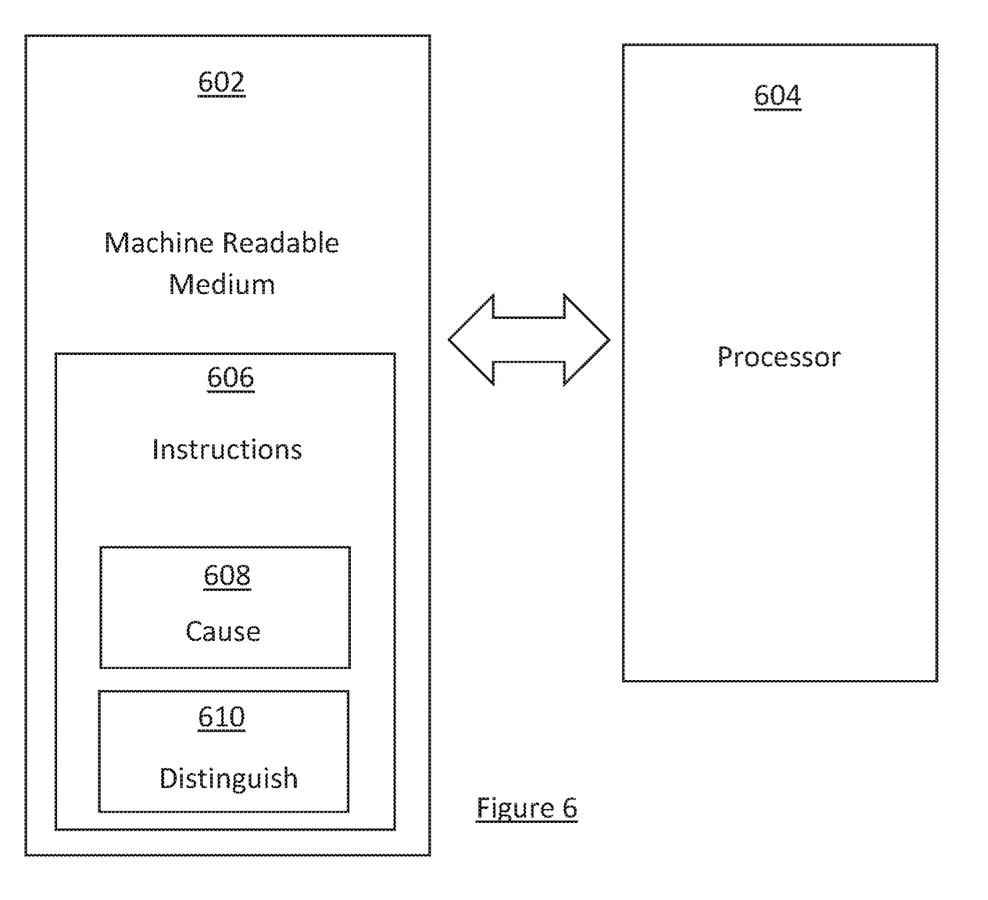
FIG. 6 is a simplified schematic of an example machine-readable medium in association with a processor.

FIG. 6 shows an example tangible (and non-transitory) machine-readable medium 602 in association with a processor 604. The tangible machine-readable medium 602 comprises instructions 606 which, when executed by a processor 604, cause the processor 604 to carry out a plurality of tasks. The instructions 606, when executed by a processor, may cause the processor to carry out any one of blocks 402-406 or 502-514 of the method 400 and 500 as described above. The instructions 606 comprise instructions 608 to cause the processor to cause an identifiable agent (for example, a visually identifiable agent) to be distinguishable (for example, visually distinguishable) to thereby cause a portion of a 3D object, corresponding to a portion of build material to which the identifiable agent was applied in additive manufacturing, to be visually distinguishable from any build material remnant disposed thereon and to which no identifiable agent was applied. In some examples, the identifiable agent may be applied to a portion of the 3D object to which binder agent (or fusing agent) was applied. The instructions 606 comprise instructions 610 to cause the processor to distinguish the build material remnant from the portion of the 3D object.

The instructions 606 may comprise instructions to cause the processor to generate a high-contrast image of the 3D object in which the portion of the object corresponding to the portion of build material to which binder agent was applied is distinguishable from any build material remnant thereon.

The instructions 606 may comprise instructions that cause the processor to cause the portion of the object to which binder agent was applied to fluoresce. The instructions 608 may comprise instructions which cause the processor to direct a cleaning module to a portion of the object comprising the build material remnant to remove the build material remnant.

The instructions 606 may comprise instructions that cause the processor to direct a cleaning module to a portion of the 3D object comprising build material remnant to remove the build material remnant. For example, the processor may be caused to operate and/or move the cleaning module 350 (e.g. the articulated arm 362 thereof) so that the cleaning nozzle is positioned proximate to areas of the object containing build material remnant, for example based on the high-contrast image generated of the 3D object. In other words, the instructions 606 may comprise instructions to cause the build material remnant to be removed from the 3D object, for example based on the high-contrast image generated thereof.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A system for post-processing a three-dimensional (3D) object generated in an additive manufacturing process in which an identifiable agent is applied to a portion of a build material to form a portion of the 3D object, the system comprising:
    an identification unit to cause the identifiable agent to become distinguishable to thereby cause the portion of the 3D object, corresponding to the portion of build material to which the identifiable agent was applied, to be distinguishable from any build material remnant disposed on the 3D object and to which no identifiable agent was applied; and
    a sensor to distinguish the build material remnant from the portion of the 3D object.

2. The system of claim 1 further comprising:
    a cleaning module; and
    a controller communicatively coupled to the sensor and to control the cleaning module to remove the build material remnant from the portion of the 3D object.

3. The system of claim 2 wherein the cleaning module comprises a cleaning nozzle to expel compressed air and wherein the controller is to direct the cleaning nozzle proximate the build material remnant.

4. The system of claim 1 wherein the identification unit comprises an ultraviolet (UV) light source for emitting UV light to cause the portion of the 3D object to which the identifiable agent was applied to fluoresce, and wherein the sensor is to receive UV light to thereby identify the build material remnant as a portion of the 3D object that does not fluoresce when exposed to the UV light emitted by the identification unit.

5. The system of claim 1 wherein the identifiable agent comprises a binder agent or a fusing agent.

6. The system of claim 1 wherein the identification unit comprises a filter to transmit light having a wavelength that is reflected by the portion of the 3D object to which the identifiable agent was applied, and wherein the sensor is to identify the build material remnant as a portion of the 3D object not emitting or reflecting light transmitted by the filter.

7. A method comprising:
    receiving, in a post-processing station, a three-dimensional (3D) object generated in an additive manufacturing process in which an identifiable agent is applied to a portion of a build material to form a portion of the 3D object;
    causing the identifiable agent in the identifiable agent to become distinguishable, thereby causing a portion of the 3D object, corresponding to the portion of build material to which the identifiable agent was applied, to be distinguishable from any build material remnant disposed on the 3D object and to which no identifiable agent was applied; and
    distinguishing the build material remnant from the portion of the 3D object.

8. The method of claim 7 further comprising:
    operating a cleaning module to remove the build material remnant from the portion of the 3D object.

9. The method of claim 8 further comprising:
    operating the cleaning module to move proximate a portion of the 3D object having build material remnant disposed thereon.

10. The method of claim 7 further comprising:
    generating an image of the 3D object in which the portions of the 3D object to which the identifiable agent was applied are shown in high contrast to the build material remnant.

11. The method of claim 7 further comprising, prior to receiving the 3D object, applying the identifiable agent to a portion of build material that corresponds to a portion of an object to be generated in additive manufacturing; and curing the build material to form the 3D object.

12. A non-transitory machine-readable medium comprising instructions that, when executed by a processor, cause the processor to:

cause an identifiable agent to be distinguishable, to thereby cause a portion of a three-dimensional (3D) object, corresponding to a portion of build material to which the identifiable agent was applied in an additive manufacturing process, to be distinguishable from any build material remnant disposed on the 3D object and to which no identifiable agent was applied; and to distinguish the build material remnant from the portion of the 3D object.

13. The non-transitory machine-readable medium of claim 12 wherein the instructions are to cause the processor to:

generate a high-contrast image of the 3D object in which the portion of the object corresponding to the portion of build material to which the identifiable agent was applied is distinguishable from any build material remnant.

14. The non-transitory machine-readable medium of claim 12 wherein the instructions are to cause the processor to:

cause the portion of the object to which the identifiable agent was applied to fluoresce.

15. The non-transitory machine-readable medium of claim 12 wherein the instructions are to cause the processor to:

direct a cleaning module to a portion of the 3D object comprising build material remnant to remove the build material remnant.

* * * * *